(No Model.)
S. D. WETHERBY.
VEGETABLE CUTTER.
No. 347,146. Patented Aug. 10, 1886.
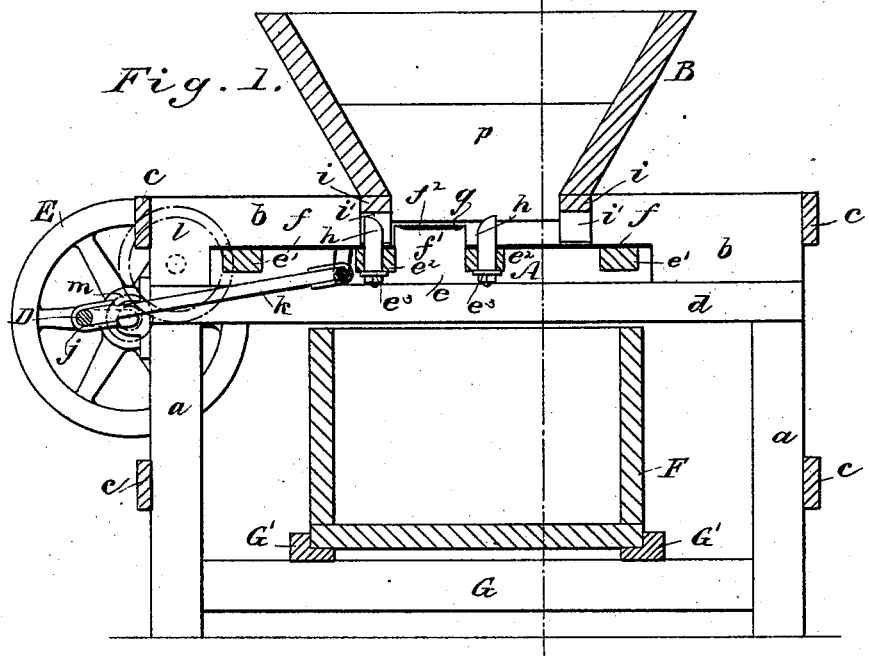
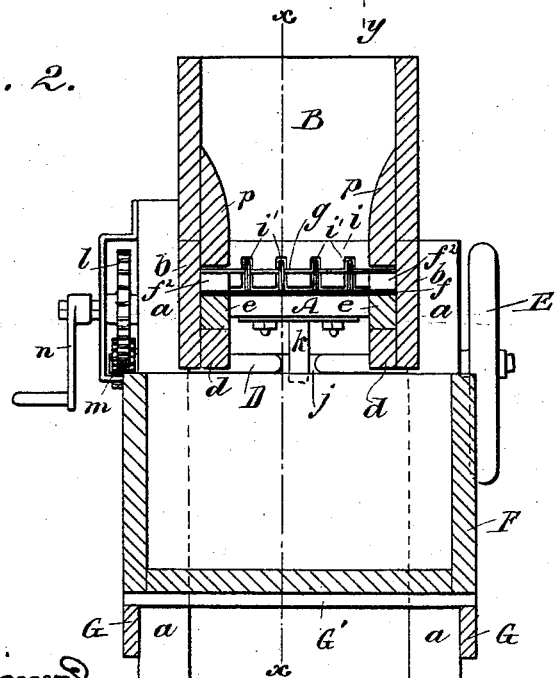
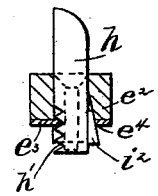
WITNESSES.
INVENTOR:
S. D. Wetherby
BY Munn & Co
ATTORNEYS.

UNITED STATES PATENT OFFICE.

STEPHEN D. WETHERBY, OF BOLIVAR, ASSIGNOR TO HIMSELF AND JOHN A. WETHERBY, OF WELLSVILLE, NEW YORK.

VEGETABLE-CUTTER.

SPECIFICATION forming part of Letters Patent No. 347,146, dated August 10, 1886.

Application filed March 18, 1886. Serial No. 195,669. (No model.)

*To all whom it may concern:*

Be it known that I, STEPHEN D. WETHERBY, of Bolivar, in the county of Allegany and State of New York, have invented a new and Improved Vegetable Cutter, of which the following is a full, clear, and exact description.

Reference is to be had to the accompanying drawings, forming part of this specification, in which similar letters of reference indicate corresponding parts in all the figures.

Figure 1 is a longitudinal sectional elevation of my new and improved vegetable-cutter, taken on the line $x\ x$, Fig. 2. Fig. 2 is a transverse sectional elevation of the same, taken on the line $y\ y$ of Fig. 1; and Fig. 3 is an enlarged detailed sectional view showing the construction of the vertical knives and the means for holding them.

The invention will first be described in connection with the drawings, and then pointed out in the claims.

The main frame of my new vegetable cutter is composed of the four upright posts $a\ a$, upper main side pieces, $b\ b$, and end cross-pieces, $c\ c$. The main side pieces, $b$, are secured inside of the posts $a$, as shown clearly in Fig. 2; and secured to the inner or adjacent surfaces of the side pieces, $b$, at or near their lower edges, are the cleats $d\ d$, on which the knife-frame A runs.

To the upper edges of the side pieces, $b$, and in the center of their length, is secured the hopper B, into which the vegetables to be sliced are fed.

The knife-frame A is composed of the side bars, $e\ e$, end cross-pieces, $e'\ e'$, and central cross-pieces, $e^2\ e^2$.

Upon the upper surface of the frame A is secured the two metal plates $f$. These are placed to form a central space, $f'$, shown in Fig. 1, for the sliced vegetable to pass out of the machine.

Between the ends of the plates $f\ f$ are secured to the upper surfaces of the side pieces, $e\ e$, the raised portions or cleats $f^2\ f^2$, which support the broad double-edged knife $g$ in horizontal position parallel with the bottom of the hopper B.

In each cross-piece $e^2$ is secured a series of small vertical knives, $h$, so that a series of vertical knives stand in front of each cutting edge of the broad knife $g$.

Between the side pieces, $b$, of the main frame of the machine, just above the knife-frame A, are secured the cross-pieces $i\ i$. These have a series of vertical slots, $i'\ i'$, formed in them, that correspond with the knives $h$, and the reciprocating movement of the knife-frame A is such that the knives $h$ strike into and partially through the slots, so the knives will always make a clean through-cut in the vegetable being sliced. The knife-frame A is reciprocated on the cleats $d$ by the gearing $l\ m$, hand-crank $n$, and crank-shaft D, the crank $j$ of which latter is connected to the frame A by the pitman $k$, and a balance-wheel, E, is attached to one end of the crank-shaft D, to maintain a regular and even motion. The series of knives $h$ are held in the cross-pieces $e^2$ by means of plates $e^3$ and wedges $i^2$, the plates being bolted to the under surface of the cross-pieces and formed with slots $e^4$, to receive the lower ends of the knives; and the knives $h$ are notched at one edge, as shown at $h'$, to embrace one edge of the slot $e^4$, so the knives may be held with perfect security and firmness and vertically adjusted as they wear away, or to regulate their depth of cut. The hopper B is provided at its side, upon the inside, with the beveled blocks $p\ p$, which serve to guide the vegetables placed in the hopper directly over and to the knives $g\ h$; and beneath the hopper B and knife-frame A is placed a receptacle, F, held upon the side pieces, G G, and cross-pieces G' G' of the frame of the machine, to receive the cut vegetable as it drops from the cutting-knives.

In operation the vegetables to be cut are simply thrown into the hopper B and the crank $n$ revolved, which causes the knife-frame A to be rapidly reciprocated, causing the knives $h$ to cut the vegetables vertically and the knife $g$ to slice them horizontally, so that the combined action of the knives cut the vegetables into small chunks or narrow strips suitable to feed to stock.

I am aware that the sliding carriage of a vegetable-cutter has been provided with a central aperture, a transverse two-edged knife arranged over said aperture, and short vertical knives secured on the top of the two-edged knife. The hopper was provided with slotted strips for the passage of the vertical knives. In another form of sliding cutter the central aperture was provided with a series of longitudinal knives and a flat knife transverse thereto. Both of the two-edge knives referred to were beveled from their outer edges inward and downward toward the center. I am also aware that a tool-holder has been constructed of an angular bar of iron, having one end bent and apertured, to receive a tool, which tool was transversely notched and held in said aperture by a gib having a short transverse wire passed through it and engaging one of the notches, and a wedge driven into the aperture and holding the gib in place, and I do not claim said prior constructions as of my invention.

Having thus described my invention, I claim as new and desire to secure by Letters Patent—

1. The combination, with the frame, the hopper having the cross-pieces $i$, slotted at $i'$, of the knife-frame A, below the hopper, having an opening, $f'$, a transverse two-edged knife, $g$, above said opening, and the vertical knives in front of each cutting-edge of the knife $g$, and in alignment with the slots $i'$, substantially as set forth.

2. The combination, with the knife-frame having an aperture therein, and a metal plate, $e^2$, also apertured, and having one edge or wall of the said aperture extending slightly across the aperture in the knife-frame, of the knife $h$, passed through said apertures, and having notches $h'$, one of which receives the said projecting edge, and a key, $i^2$, entering said apertures at a point opposite the notches, substantially as set forth.

STEPHEN D. WETHERBY.

Witnesses:
CHARLES F. VINCENT,
LORA F. VINCENT.